United States Patent
Coffinet et al.

(10) Patent No.: US 12,453,797 B2
(45) Date of Patent: Oct. 28, 2025

(54) IN-CAR DISPENSER FOR FRAGRANCE AND DISINFECTANT

(71) Applicant: Bayerische Motoren Werke Aktiengesellschaft, Munich (DE)

(72) Inventors: Annabelle Coffinet, Munich (DE); Peter Hill, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 472 days.

(21) Appl. No.: 17/925,716

(22) PCT Filed: Jul. 2, 2021

(86) PCT No.: PCT/EP2021/068333
§ 371 (c)(1),
(2) Date: Nov. 16, 2022

(87) PCT Pub. No.: WO2022/012972
PCT Pub. Date: Jan. 20, 2022

(65) Prior Publication Data
US 2023/0173124 A1    Jun. 8, 2023

(30) Foreign Application Priority Data
Jul. 13, 2020   (DE) ............... 10 2020 118 422.0

(51) Int. Cl.
*A61L 9/03* (2006.01)
*A61L 9/14* (2006.01)
*B60H 3/00* (2006.01)

(52) U.S. Cl.
CPC ............ *A61L 9/03* (2013.01); *A61L 9/14* (2013.01); *B60H 3/0007* (2013.01);
(Continued)

(58) Field of Classification Search
None
See application file for complete search history.

(56) References Cited

U.S. PATENT DOCUMENTS 5,593,635 A    1/1997    Matsumoto et al.
5,740,947 A    4/1998    Flaig et al.
(Continued)

FOREIGN PATENT DOCUMENTS

CH    667 629 A5    10/1988
CN    202715063 U    2/2013
(Continued)

OTHER PUBLICATIONS

KR20020025505A—translated document (Year: 2002).*
(Continued)

*Primary Examiner* — Jelitza M Perez
(74) *Attorney, Agent, or Firm* — Crowell & Moring LLP

(57) ABSTRACT

A fragrance and disinfectant dispenser is provided for in-car use, having a container that has an open-topped cavity for receiving a fragrance unit, which unit gives off fragrance when heated to a predefined temperature, and for receiving a disinfectant that is in the form of a liquid or a foam, wherein the cavity is formed by side walls and a bottom connected thereto. An electronically actuatable temperature-control unit is arranged below the cavity and is designed to activate the at least one fragrance unit arranged in the at least one cavity in such a way that the fragrance unit gives off fragrance. A dispensing device is arranged in the cavity, is operatively connected to the disinfectant, and is designed to dispense disinfectant from the container when actuated.

11 Claims, 2 Drawing Sheets

(52) U.S. Cl.
CPC ...... *A61L 2209/11* (2013.01); *A61L 2209/133* (2013.01); *A61L 2209/134* (2013.01); *B60H 2003/005* (2013.01)

(56) References Cited

U.S. PATENT DOCUMENTS

| | | | |
|---|---|---|---|
| 2002/0066967 A1* | 6/2002 | Bartsch | A61L 9/122 |
| | | | 261/DIG. 89 |
| 2016/0152117 A1 | 6/2016 | Backman et al. | |
| 2017/0252476 A1 | 9/2017 | Koontz et al. | |
| 2018/0292058 A1 | 10/2018 | Li | |

FOREIGN PATENT DOCUMENTS

| | | | |
|---|---|---|---|
| CN | 103685653 A | | 3/2014 |
| CN | 105792858 A | | 7/2016 |
| CN | 108653785 A | | 10/2018 |
| CN | 109152857 A | | 1/2019 |
| DE | 299 03 993 U1 | | 7/1999 |
| DE | 695 12 333 T2 | | 1/2000 |
| DE | 697 18 096 T2 | | 8/2003 |
| DE | 20 2008 011 963 U1 | | 1/2009 |
| DE | 20 2014 009 431 U1 | | 4/2016 |
| EP | 0 816 148 A1 | | 1/1998 |
| KR | 10-0363322 B1 | | 12/2002 |
| KR | 20020025505 A | * | 12/2002 |
| WO | WO 2015/052215 A1 | | 4/2015 |

OTHER PUBLICATIONS

International Search Report (PCT/ISA/210) issued in PCT Application No. PCT/EP2021/068333 dated Oct. 14, 2021 with English translation (four (4) pages).
German-language Written Opinion (PCT/ISA/237) issued in PCT Application No. PCT/EP2021/068333 dated Oct. 14, 2021 (six (6) pages).
German-language Search Report issued in German Application No. 10 2020 118 422.0 dated Feb. 26, 2021 with partial English translation (10 pages).
English translation of Chinese Office Action issued in Chinese Application No. 202180029666.8 dated Apr. 29, 2023 (6 pages).
English translation of Chinese-language Office Action issued in Chinese Application No. 202180029666.8 dated Jun. 18, 2025 (7 pages).
Bijie H. et al., "SIFIC Hospital Infection Prevention and Control Product Usage Guidelines", Shanghai Science and Technology Press, May 31, 2014, pp. 49-50 (6 pages).

* cited by examiner

IN-CAR DISPENSER FOR FRAGRANCE AND DISINFECTANT

BACKGROUND AND SUMMARY

The invention relates to a fragrance and disinfectant dispenser for use in vehicles.

No accessories which constitute a combination of fragrance and disinfectant dispensers are currently known for use in vehicles.

Therefore, an object of this invention is to provide such an accessory. This object is achieved according to the invention by the features of the independent patent claims. The dependent claims relate to advantageous embodiments.

There is proposed a fragrance and disinfectant dispenser for use in vehicles, having a container having an upwardly open hollow space for receiving a fragrance unit which discharges fragrances by means of a predetermined temperature control and for receiving a disinfectant which is in the form of a liquid or foam, wherein the hollow space is formed by side walls and a base which is connected thereto. Furthermore, an electronically controllable temperature control unit is arranged under the hollow space and is configured to activate the at least one fragrance unit which is arranged in the at least one hollow space in such a manner that it discharges fragrances. Furthermore, there is provided a dispensing device which is arranged in the hollow space in operational connection with the disinfectant and which is configured to discharge disinfectant toward the exterior of the container as a result of actuation.

As a result of the combination of the fragrance unit and disinfectant dispenser in one container, two functionalities are made available in the tightest space and in an aesthetically pleasing manner. In this case, extremely different configurations can be selected depending on design requirements and also the intended use.

There is further provision for the fragrance unit to be formed as an upwardly open, otherwise media-tight cartridge. This cartridge can be introduced into the disinfectant, that is to say, so to speak can float therein. Retention members can also be provided in order to retain the cartridge in a predetermined position inside the hollow space, that is to say, the disinfectant. However, it can also be introduced into a hollow space which is provided for the fragrance unit in the case of the division of the hollow space as described below, that is to say, not be in contact with the disinfectant.

There is further provision for the hollow space to be formed in several pieces so that the fragrance unit and disinfectant are arranged separately from each other therein. In one embodiment, there is provision for, if the container has a round cross section, the hollow space to be subdivided into at least two concentric hollow spaces or into at least two identical or differently sized circle portions. Alternatively, there is provision, if the container has an angular cross section, for the hollow space to have at least one inner circle as a first hollow space or to be divided into at least two identical or differently sized part-regions. By dividing the hollow space into a plurality of part-regions, the fragrance unit and disinfectant can be provided separately from each other. The subdivision is carried out by means of a partition wall which can be formed both in a linear manner and in a cylindrical manner.

There is further provision for at least one part-region of the side walls of the container to have openings which act as a fragrance outlet. Consequently, not only is the fragrance discharged upwardly, but it is better distributed. This is particularly advantageous when a cover which closes the opening of the hollow space is provided.

There is further provision for the dispensing device to be in the form of at least one rigid tubular member or a pivotable and/or rotatable tubular member. Thus, the discharge of the disinfectant is simplified.

There is further provision for the container to be rotatably formed along the longitudinal axis thereof. This is particularly advantageous if a rigid tubular member is provided. However, it may also be advantageous if the fragrance unit and disinfectant are separated from each other and a passenger would like to have more of the discharged fragrance. Thus, the passenger can turn the portion with the fragrance unit toward him/herself.

There is further provision for the dispensing device to be in such a form that it discharges the disinfectant as a result of manual or electrical operation.

There is further provision for the disinfectant to be in such a form that it can be placed into a gaseous state by predetermined control by the temperature control unit and wherein the dispensing device is in such a form that it sprays the gaseous disinfectant in the vehicle interior. In this case, there may be provision for the disinfectant to be released exclusively when nobody, including animals, is present in the vehicle.

Additional features and advantages of the invention will be appreciated from the following description of embodiments of the invention with reference to the Figures of the drawings which set out details according to the invention and from the claims. The individual features can be implemented individually per se or together in any combination in a variant of the invention.

Preferred embodiments of the invention will be explained in greater detail below with reference to the appended drawings.

BRIEF DESCRIPTION OF THE DRAWINGS

In the following descriptions of the Figures, identical elements or functions are referred to using the same reference numerals.

DETAILED DESCRIPTION OF THE DRAWINGS

Figure 1:
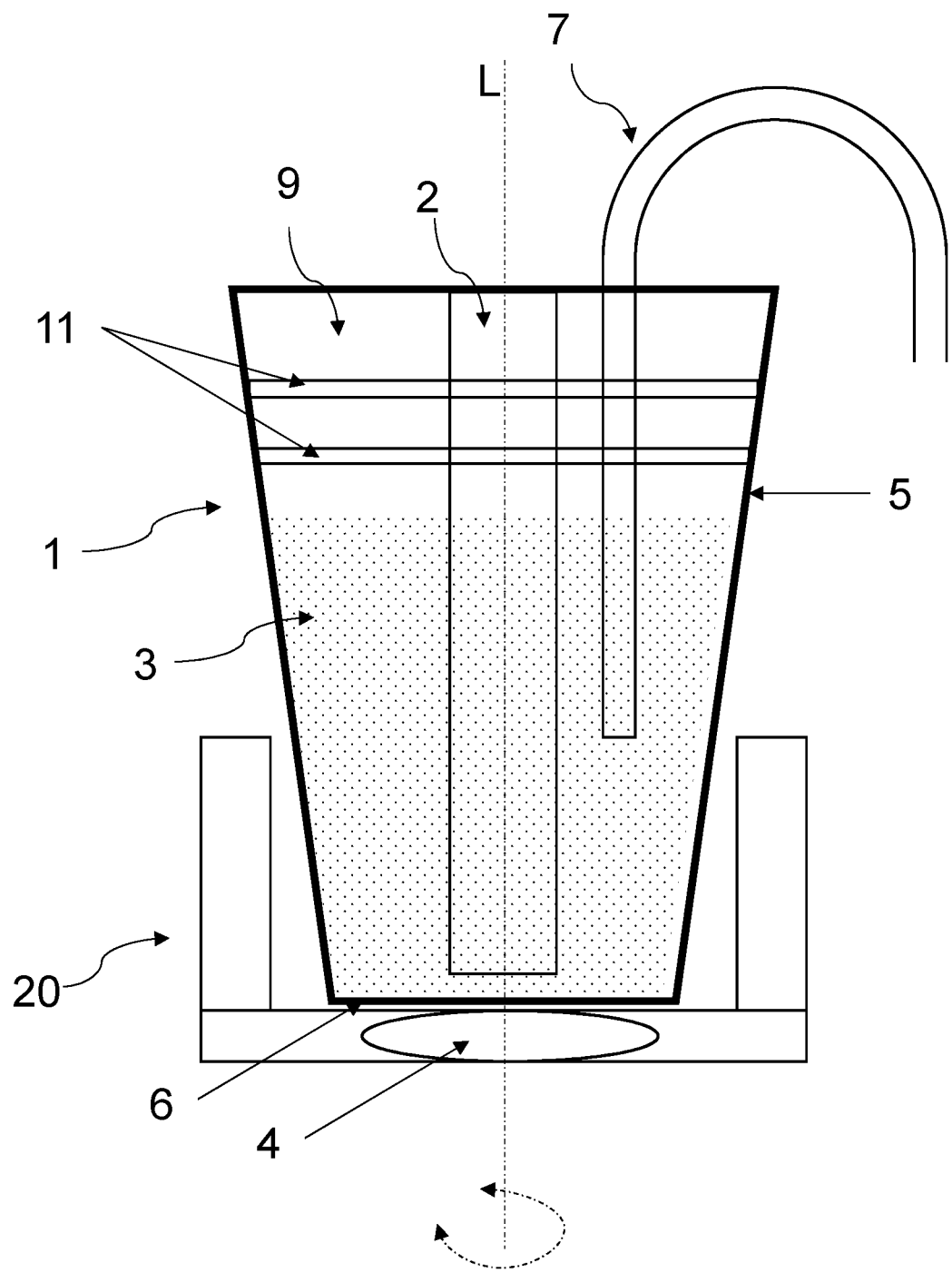
FIG. 1 is a schematic cross sectional view of a fragrance and disinfectant dispenser for use in a vehicle according to an embodiment of the present invention.

FIG. 1 shows a fragrance and disinfectant dispenser for use in a vehicle. This fragrance and disinfectant dispenser comprises a container 1 which has an upwardly open hollow space 8, 9 which is formed by side walls 5 and a base 6 which is connected thereto. The hollow space 8, 9 is used to receive a fragrance unit 2 which discharges fragrances as a result of predetermined temperature control and a disinfectant 3 which is in the form of a liquid or foam.

In one embodiment, which is shown in FIG. 1, the fragrance unit 2 is in the form of a cartridge which is advantageously upwardly open in order to discharge fragrances, but is otherwise media-tight, that is to say, laterally and downwardly media-tight. Consequently, it can be introduced directly into the disinfectant 3 and can consequently float therein in a manner of speaking. In this case, however, fragrances and disinfectants 3 do not come into contact with each other.

An alternative in which fragrances and disinfectants 3 also do not come into contact with each other involves subdividing the hollow space 8, 9 into at least two part-regions, one part-region which is in the form of a hollow space 8 for receiving the fragrance unit 2 and one hollow space 9 which is formed to receive the disinfectant 3.

Figure 2:
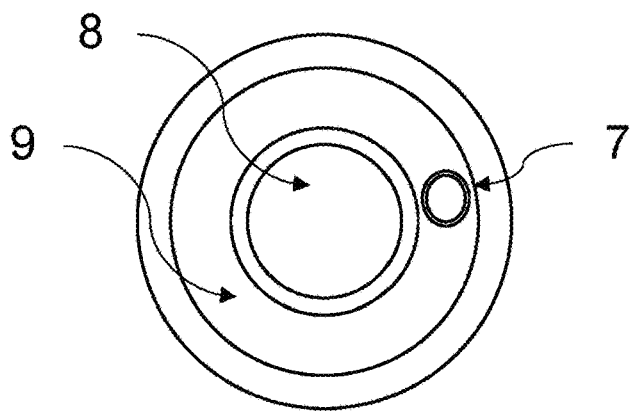
FIGS. 2 to 6 are plan views of different embodiments of the fragrance and disinfectant dispenser.

To this end, there may be provision for at least two hollow spaces 8, 9 to be formed in the event that the container 1 has a (substantially) round cross section. If two hollow spaces 8, 9 are formed, as shown in FIG. 2, the second hollow space is formed, for example, by introducing a concentric partition wall relative to the outer cross section. In this case, there is shown an embodiment in which the disinfectant 3 is provided in the outer hollow space 9 and the fragrance unit 2 is provided in the inner hollow space 8. However, it may also be precisely the other way round. The size of the hollow space 9 for receiving the disinfectant 3 can be selected depending on the use to be greater than, smaller than or of the same size as the hollow space 8 for receiving the fragrance unit 2.

Figure 3:
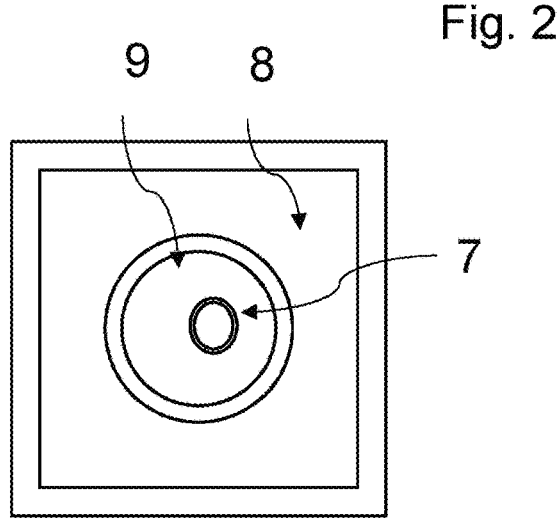

Alternatively, in the event that the container 1 is not round but instead is in the form of a polygon with linear side walls 5, at least two hollow spaces 8, 9 can also be formed. In the event that two hollow spaces 8, 9 are formed, as shown in FIG. 3, a hollow space 9 is in the form, for example, of a cylinder, that is to say, with a circular cross section. In FIG. 3, this is the hollow space 9 which is provided for receiving the disinfectant 3. However, it may also be precisely the other way round, as in all the embodiments.

Figure 4:
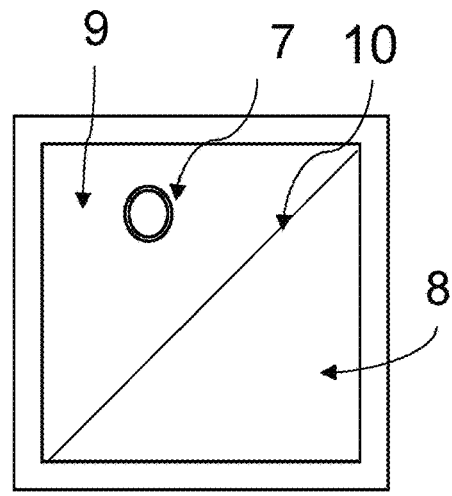
Figure 5:
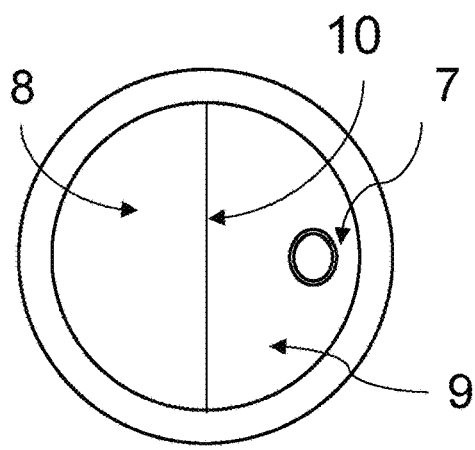
Figure 6:
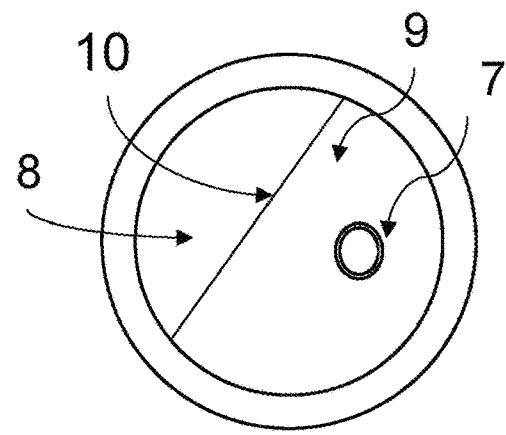

Furthermore, in an alternative manner, both in the event that the container 1 is round and in the event that the container is in the form of a polygon, a subdivision can be carried out by drawing in a linear partition wall 10, as illustrated in FIGS. 4 to 6. In this instance, the subdivision can also be carried out in such a manner that the size of the hollow space 9 for receiving the disinfectant 3 is selected depending on the use to be greater than, smaller than or of the same size as the hollow space 8 for receiving the fragrance unit 2.

In one embodiment, at least one part-region of the side walls 5 of the container 1 may have openings which act as a fragrance outlet 11. The openings can be formed differently, for example, as one or more circumferential slots, one or more holes. If the container 1 is round, the side walls 5 are in the form of a circumferential side wall 5 and, if the container is in angular form, a plurality of side walls 5 which abut each other at an angle and which are connected to each other are provided. In this case, the openings can be provided only in part-regions of the (circumferential) side wall or the plurality of side walls 5. As a result of the lateral openings in the container, the fragrance can be better distributed. If a cover which closes the upper opening of the container 1 is additionally provided, the openings can act as a single fragrance outlet 11. If the fragrance unit 2 is in the form of a cartridge, it advantageously has openings which correspond to the openings in the side walls 5.

In all the embodiments, the fragrance unit 2 may be in the form of a cartridge with a fragrance which is contained therein and which is in the form of a solid. However, the fragrance unit 2 can also be in the form of a liquid or foam with fragrances contained therein or a solid block (without a housing, such as, for example, a cartridge). The fragrance unit or fragrances are formed in such manner in this case that they are discharged only after activation by being heated. That is to say that no constant fragrancing is carried out but instead only fragrancing in accordance with requirements upon demand or activation. The activation is carried out by heating, that is to say, temperature control. This is carried out by means of an electronically controllable temperature control unit 4 which is arranged under the hollow space 8 in which the fragrance unit 2 is provided. The temperature control unit 4 is advantageously formed in such a manner that it allows a contactless temperature control. To this end, it is advantageously formed as a Peltier element which is arranged on the base 6 of the container 1. Alternatively, there may be provision for the base 6 to act as a portion of the temperature control unit 4, for example, as a heating coil, which is heated by applying electrical current in a cable-bound manner.

The temperature control unit 4 advantageously has a connection with respect to a control device of the vehicle which determines in accordance with predetermined factors when fragrance and which fragrance is intended to be discharged into the vehicle interior and which transmits a corresponding control signal to the temperature control unit 4 so that it heats the fragrance unit 2 so that the fragrances provided are activated and are discharged to the ambient air as a result. However, the temperature control unit 4 may also be able to be activated manually.

Furthermore, the container 1 has a dispensing device 7 which is arranged in the hollow space 9 in operational connection with the disinfectant 3 and which is configured to discharge disinfectant 3 toward the exterior of the container 1 as a result of activation. To this end, the dispensing device 7 is in the form of at least one rigid tubular member or a pivotable and/or rotatable tubular member which is immersed in the disinfectant 3 as deeply as possible. A plurality of tubular members can also be provided. Any dispensing device 7 which is hollow at its inner side, which has two openings at the ends thereof and which is immersed at one end in the disinfectant 3 and which discharges the disinfectant 3 at the other end thereof can be described as a tubular member. In this case, the movement of the disinfectant 3 through the tubular member can be carried out by providing a pump unit, as known, for example, in soap dispensers. The activation of the discharge of the disinfectant 3 can be carried out manually, that is to say, by manually actuating the tubular member or the pump which is connected thereto (and which is not shown in FIG. 1). However, the actuation can also be controlled electronically. For example, a proximity sensor which actuates the discharge of the disinfectant 3 during an approach may be provided. Alternatively, buttons, levers, knobs, etcetera, which bring about an electronically controlled discharge of the disinfectant 3 in the event of manual actuation may also be provided. A pump mechanism which pumps the disinfectant 3 through the tubular member in the case of actuation, whether manually or electrically, is advantageously always provided.

In another embodiment, the container 1 is rotatably formed along the longitudinal axis L thereof, for example, by arrangement on a rotary plate in the retention member 20, in which the container 1 is introduced for securing. This has the advantage that the disinfectant 3 can nevertheless be used comfortably by a plurality of occupants, for example, in the case of a rigidly arranged dispensing device 7 because they can turn the dispensing device 7 toward them by rotating the container 1.

As already mentioned, the container 1 is provided to be introduced into a retention member 20, for example, in the central console of the vehicle 100. The structural configuration is also dependent on the location of the arrangement. Naturally, the container 1 can also be arranged at other positions in the interior of the vehicle 100.

In another embodiment, the disinfectant 3 is formed in such a manner that it can be placed into a gaseous state by predetermined control by the temperature control unit 4. The dispensing device 7 is then in such a form that the gaseous disinfectant 3 sprays in the vehicle interior. Advantageously, this is carried out only when nobody or no animal is present in the vehicle. One or more sensors which carry out the corresponding monitoring and which can start disinfection or which can stop it if necessary, for example, when a body has been identified, can be provided for detection. Both separate sensors which are used only for this monitoring may be provided, but also sensors which are already present in the vehicle, such as seat occupancy sensors or interior cameras, can be used. The processing of the signals is carried out in a control device which can also be configured separately from other control devices of the vehicle or as a portion thereof. Furthermore, there may be provision for the system for disinfecting to be able to be switched on and off manually. In addition, there may be provision for the automatic control to be carried out cyclically, wherein there may be provision in this instance for an information item to be output to one or more users of the vehicle when the next cycle is intended. Consequently, the users can act accordingly or manually stop the discharge. In this embodiment, it is advantageous for the temperature control unit 4 also to be provided to control the temperature of the disinfectant 3. In order to prevent the disinfectant 3 from being discharged together with the fragrances, the fragrances and the disinfectant 3 may be able to be activated at different temperatures, which can be solved by the chemical composition. Alternatively, two heating units or even two temperature control units 4 are provided.

LIST OF REFERENCE NUMERALS

1 Container
2 Fragrance unit
3 Disinfectant
4 Temperature control unit
5 Side walls of container
6 Base
7 Dispensing device
8 Hollow space for fragrance
9 Hollow space for disinfectant
10 Partition wall between 8 and 9
11 Fragrance outlet
20 Retention member in vehicle
L Longitudinal axis

The invention claimed is:

1. A fragrance and disinfectant dispenser for use in a vehicle, comprising:
   a container having an upwardly open hollow space for receiving a fragrance unit which discharges fragrances via a predetermined temperature control and a disinfectant which is in the form of a liquid or foam, wherein the hollow space is formed by side walls and a base which is connected thereto, the fragrance unit is formed as an upwardly open, otherwise laterally and downwardly media-tight cartridge, and the cartridge is introduced into the disinfectant;
   an electronically controllable temperature control unit which is arranged under the hollow space and which is configured to activate the fragrance unit which is arranged in the hollow space in such a manner that the fragrance unit discharges fragrances, and
   a dispensing device which is arranged in the hollow space in operational connection with the disinfectant and which is configured to discharge disinfectant toward an exterior of the container as a result of actuation.

2. The fragrance and disinfectant dispenser according to claim 1, wherein
   the hollow space has several regions so that the fragrance unit and disinfectant are arranged separately from each other therein.

3. The fragrance and disinfectant dispenser according to claim 2, wherein
   the container has a round cross section, and the hollow space is subdivided into at least two concentric hollow spaces.

4. The fragrance and disinfectant dispenser according to claim 1, wherein
   at least one part-region of the side walls of the container has openings which act as a fragrance outlet.

5. The fragrance and disinfectant dispenser according to claim 1, wherein
   the dispensing device comprises at least one rigid tubular member or a pivotable and/or rotatable tubular member.

6. The fragrance and disinfectant dispenser according to claim 5, wherein
   the dispensing device is configured so as to discharge the disinfectant as a result of manual or electrical operation.

7. The fragrance and disinfectant dispenser according to claim 1, wherein
   the container is formed in a rotatable manner along a longitudinal axis thereof.

8. The fragrance and disinfectant dispenser according to claim 1, wherein
   the disinfectant is dispensed in such a form that the disinfectant is in a gaseous state via predetermined control by the temperature control unit, and
   the dispensing device is configured to spray the gaseous disinfectant in an interior of the vehicle.

9. The fragrance and disinfectant dispenser according to claim 2, wherein
   the container has a round cross section, and the hollow space is subdivided into at least two identical or differently sized circle portions.

10. The fragrance and disinfectant dispenser according to claim 2, wherein
    the container has an angular cross section, and the hollow space has at least one inner circle as a first hollow space.

11. The fragrance and disinfectant dispenser according to claim 2, wherein
    the container has an angular cross section, and the hollow space is divided into at least two identical or differently sized part-regions.

* * * * *